（12) United States Patent
Selvarajan et al.

(10) Patent No.: US 6,279,033 B1
(45) Date of Patent: Aug. 21, 2001

(54) SYSTEM AND METHOD FOR ASYNCHRONOUS CONTROL OF REPORT GENERATION USING A NETWORK INTERFACE

(75) Inventors: Inbarajan Selvarajan, Falls Church; Damon W. Smith; Lee C. Harold, both of Arlington; Ali Alavi, Falls Church, all of VA (US)

(73) Assignee: Microstrategy, Inc., Vienna, VA (US)

( * ) Notice: Subject to any disclaimer, the term of this patent is extended or adjusted under 35 U.S.C. 154(b) by 0 days.

(21) Appl. No.: 09/321,830

(22) Filed: May 28, 1999

(51) Int. Cl.[7] ................................................ G06F 15/16
(52) U.S. Cl. .................................... 709/217; 709/219
(58) Field of Search ............................... 709/217, 219, 709/218, 200, 202, 229; 707/101, 102

(56) References Cited

U.S. PATENT DOCUMENTS

| | | | |
|---|---|---|---|
| 5,943,677 | * | 8/1999 | Hicks ................................... 707/205 |
| 5,946,711 | * | 8/1999 | Donnelly ............................. 711/152 |
| 6,078,924 | * | 6/2000 | Ainsbury et al. .................... 707/101 |
| 6,078,994 | * | 6/2000 | Carey .................................. 711/133 |
| 6,122,628 | * | 9/2000 | Castelli et al. ........................... 707/5 |
| 6,122,636 | * | 9/2000 | Malloy et al. ...................... 707/102 |

\* cited by examiner

*Primary Examiner*—Dung C. Dinh
*Assistant Examiner*—Tod Kupstas
(74) *Attorney, Agent, or Firm*—Hunton & Williams

(57) ABSTRACT

An OLAP system with decision support technology for enabling a user to asynchronously generate report requests through a web browser or other user interface module connected over a network to the OLAP system. Once the request is received by the server, the web browser is freed to enable the user to conduct other activities including the requesting of other reports while the first requested report is processing. The server maintains a list of reports requested. With each request for a report received, the system determines whether a similar report has been requested and either generates the report if the report has not been previously requested or adds a request by that user to a report list of a report that has been previously requested without processing the report again. If the requested report was already completed, the results are immediately returned to the user. The report list may be used to display the status of reports requested and provide a system user with various options relating to the reports being generated (e.g., cancel, refresh).

30 Claims, 7 Drawing Sheets

SYSTEM AND METHOD FOR ASYNCHRONOUS CONTROL OF REPORT GENERATION USING A NETWORK INTERFACE

RELATED APPLICATIONS

This application is related by subject matter to co-pending applications entitled "System and Method For OLAP Report Generation With Spreadsheet Report Within the Network User Interface," Ser. No. 09/321,738 and "System and Method For Network User Interface OLAP Report Formatting," Ser. No. 09/321,743, both of which are filed herewith.

FIELD OF THE INVENTION

This invention relates to a system and method for asynchronously generating reports in a multi-user on-line analytical processing system.

BACKGROUND OF THE INVENTION

The ability to act quickly and decisively in today's increasingly competitive marketplace is critical to the success of any organization. The volume of data that is available to organizations is rapidly increasing and frequently overwhelming. The availability of large volumes of data presents various challenges. One challenge is to avoid inundating an individual with unnecessary information. Another challenge it to ensure all relevant information is available in a timely manner.

One known approach to addressing these and other challenges is known as data warehousing. Data warehouses and data marts are becoming important elements of many information delivery systems because they provide a central location where a reconciled version of data extracted from a wide variety of operational systems may be stored. As used herein, a data warehouse should be understood to be an informational database that stores shareable data from one or more operational databases of record, such as one or more transaction-based database systems. A data warehouse typically allows users to tap into a business's vast store of operational data to track and respond to business trends that facilitate forecasting and planning efforts. A data mart may be considered to be a type of data warehouse that focuses on a particular business segment.

Decision support systems have been developed to efficiently retrieve selected information from data warehouses. One type of decision support system is known as an on-line analytical processing system ("OLAP"). In general, OLAP systems analyze the data from a number of different perspectives and support complex analyses against large input data sets.

There are at least three different types of OLAP architectures—ROLAP, MOLAP, and HOLAP. ROLAP ("Relational On-Line Analytical Processing") systems are systems that use a dynamic server connected to a relational database system. Multidimensional OLAP ("MOLAP") utilizes a proprietary multidimensional database ("MDDB") to provide OLAP analyses. The main premise of this architecture is that data must be stored multidimensionally to be viewed multidimensionally. A HOLAP ("Hybrid On-Line Analytical Processing") system is a hybrid of these two.

ROLAP is a multi-tier, client/server architecture comprising a presentation tier, an application logic tier and a relational database tier. The relational database tier stores data and connects to the application logic tier. The application logic tier comprises a ROLAP engine that executes multidimensional reports from multiple end users. The ROLAP engine integrates with a variety of presentation layers, through which users perform OLAP analyses. The presentation layers enable users to provide requests to the ROLAP engine. The premise of ROLAP is that OLAP capabilities are best provided directly against a relational database, e.g., the data warehouse.

In a ROLAP system, data from transaction-processing systems is loaded into a defined data model in the data warehouse. Database routines are run to aggregate the data, if required by the data model. Indices are then created to optimize query access times. End users submit multidimensional analyses to the ROLAP engine, which then dynamically transforms the requests into SQL execution plans. The SQL is submitted to the relational database for processing, the relational query results are cross-tabulated, and a multidimensional result set is returned to the end user. ROLAP is a fully dynamic architecture capable of utilizing precalculated results when they are available, or dynamically generating results from atomic information when necessary.

The ROLAP architecture directly accesses data from data warehouses, and therefore supports optimization techniques to meet batch window requirements and to provide fast response times. These optimization techniques typically include application-level table partitioning, aggregate inferencing, denormalization of data structures, multiple fact table joins, and the use of specific RDB optimizer tactics which vary with each particular brand of relational database.

MOLAP is a two-tier, client/server architecture. In this architecture, the MDDB serves as both the database layer and the application logic layer. In the database layer, the MDDB system is responsible for all data storage, access, and retrieval processes. In the application logic layer, the MDDB is responsible for the execution of all OLAP requests. The presentation layer integrates with the application logic layer and provides an interface through which the end users view and request OLAP analyses. The client/server architecture allows multiple users to access the multidimensional database.

Information from a variety of transaction-processing systems is loaded into the MDDB System through a series of batch routines. Once this atomic data has been loaded into the MDDB, the general approach is to perform a series of batch calculations to aggregate along the orthogonal dimensions and fill the MDDB array structures. For example, revenue figures for all of the stores in a state would be added together to fill the state level cells in the database. After the array structure in the database has been filled, indices are created and hashing algorithms are used to improve query access times.

Once this compilation process has been completed, the MDDB is ready for use. Users request OLAP reports through the presentation layer, and the application logic layer of the MDDB retrieves the stored data.

The MOLAP architecture is a compilation-intensive architecture. It principally reads the precompiled data, and has limited capabilities to dynamically create aggregations or to calculate business metrics that have not been precalculated and stored.

The hybrid OLAP ("HOLAP") solution is a mix of MOLAP and relational architectures that support inquiries against summary and transaction data in an integrated fashion. The HOLAP approach enables a user to perform multidimensional analysis on data in the MDDB. However, if the user reaches the bottom of the multidimensional hierarchy and requires more detailed data, the HOLAP engine generates an SQL statement to retrieve the detailed data from the source relational database management system ("RDBMS") and returns it to the end user. HOLAP implementations rely on simple SQL statements to pull large quantities of data into the mid-tier, multidimensional engine for processing. This constrains the range of inquiry and returns large, unrefined result sets that can overwhelm networks with limited bandwidth.

As described above, each of these types of OLAP systems are typically client-server systems. The OLAP engine resides on the server side and a module is typically provided at a client-side to enable users to input queries and report requests to the OLAP engine. Current client-side modules are stand alone software modules that are loaded on client-side computer systems. One drawback of such systems is that a user must learn how to operate the client-side software module in order to initiate queries and generate reports.

Although various user interfaces have been developed to enable users to access the content of data warehouses through server systems, many such systems experience significant drawbacks. One system enables the user to access information using a network interface device (e.g., a web browser). Such systems provide the advantage of allowing users to access the content of a data warehouse through existing web browser applications residing on their desktop or other personal computer connected over a network to the server system. Such systems however suffer from various drawbacks.

In existing web-based user interfaces. a user inputs a query or report request through the web browser, the web browser initiates the report to the server, and waits until the report finishes before providing results back through the web browser to a user. While the web browser is waiting for the report, the web browser "locks up," thereby requiring that the user open another browser window if another site or page is desired to be opened. Accordingly, if the delay between the report initiation and completion is lengthy, some users may incorrectly assume that the delay is caused by an error, when in reality the delay may simply be caused by the complicated nature of the query. Users may become impatient and resubmit the report by selecting the reload or refresh feature of the web browser. Current systems treat each such request separately and, therefore, each time the user resubmits a request, another query for the same information is submitted to the server. Because the reason for the delay in most circumstances is the size or complexity of the query, the server is then hit with processing multiple complex or large queries simultaneously when only one such query or report is desired. Accordingly, these multiple reports tax server resources unnecessarily.

Another drawback this example illustrates is that current systems focus on requests. Accordingly, each request is treated as a different request that is submitted to the server for processing. Accordingly, identical requests initiated by different users are submitted to the server system for processing, thus utilizing the server resources twice to generate the same report. These and other drawbacks exist with current web-based data warehouse/server system user interfaces.

SUMMARY OF THE INVENTION

An object of the invention is to overcome these and other drawbacks in existing systems.

Another object of the invention is to provide a system and method for enabling users to asynchronously request reports in a multi-user networked OLAP system.

Another object of the invention is to provide a system and method enabling users to asynchronously request reports in a multi-user networked OLAP system that maintains a list of requests to avoid duplicating processing of requests.

Another object of the invention is to provide a system and method enabling users to asynchronously request reports in a multi-user networked OLAP system that maintains a status list of requests submitted for all users and for each user individually.

Another object of the invention is to provide a system and method enabling users to asynchronously request reports in a multi-user networked OLAP system that enables a user to cancel a request prior to its completion, freeing the server and relational database resource being exercised to process the request.

Another object of the invention is to provide a system and method enabling users to asynchronously request reports in a multi-user networked OLAP system that compares each request with all requests already processed or being processed by the system to avoid duplicative processing of requests.

These and other objects of the present invention are realized according to various embodiments of the present invention. Accordingly, an embodiment of the present invention comprises a system and method for enabling each user of a multi-user network-based OLAP system to asynchronously submit report requests to be processed by the OLAP system. A user interface module is presented to a user over a network so that the user may submit a request for a report. The server-side system receives the request and then returns control of the user interface module at the user system to the user so that the user may perform other tasks, including submission of another report, without requiring that the user wait for completion of the initial report request. When the server-side system returns control to the user system, the user system may be notified that the request has been received for processing. The request may then be processed by the server system of the OLAP system in a known manner against the data warehouse. The result of the request (e.g., a report) may then be delivered or retrieved by the user or users that submitted requests for that report.

One advantage of the present invention is that users may submit multiple reports asynchronously and then perform other tasks while the reports are being processed. This results in time savings for users and provides a more convenient and efficient user interface system for these network-based OLAP systems. Further, it avoids users growing impatient waiting on a report that they have requested to complete before they can perform other tasks on the user interface system. Therefore, users do not become impatient and resubmit the report as frequently, reducing the number of reports to be processed by the server system and thereby increasing the efficiency and throughput of the system.

According to another embodiment of the present invention, the system maintains a list of each report submitted for processing and other information related to such report. The other information may include the identification of users that requested the report, the time the report was initially requested, the estimated amount of time remaining on the report request, and the completion time if the report has been completed. This enables several advantageous functions to be performed by the system. The list may be maintained in a cache. When the cache fills up, reports may be cleaned from the list based on, for example, the age of the report, the priority of the report, the requester of the report, a predetermined schedule, or other techniques for reducing the number of entries in a cache. For example, a cache may be used and may be cleaned each time a report is requested, the system first compares the report requested with reports already pending or completed reports maintained in the cache. If the report is the same (or in some cases sufficiently similar), the system does not submit the duplicate report to be processed, but rather adds the request by that user to the report entry in the status list for that report. When the report completes, then the report is sent to all users that requested the report, regardless of when they requested the report. If the report has already completed when the user request is received, the system immediately sends the results to the user rather than re-running the report.

This system provides several advantages. First, the users receive results faster if the report has already been requested, rather than a second request for the same report being placed at the end of the queue. Further, it reduces the workload for the server system because duplicative reports are not sent to the OLAP system to tie up valuable resources.

Another function enabled by the present invention is that the system enables a user to select to review a status report containing an entry for each report that the user has submitted within a predetermined period of time. That list may include pending and recently completed reports. One advantage of such a system is that users may recall reports that they have already requested to avoid the user submitting duplicative reports. Further, the user may cancel reports that are pending from the status list.

Other objects and advantages of the present invention exist.

DETAILED DESCRIPTION OF THE PREFERRED EMBODIMENTS

Accordingly, a method of operating a network-based OLAP system is provided. The system may comprise an Internet-based web browser interface that connects users over the Internet to a web server system that connects to the OLAP server system for processing requested reports.

Figure 1:
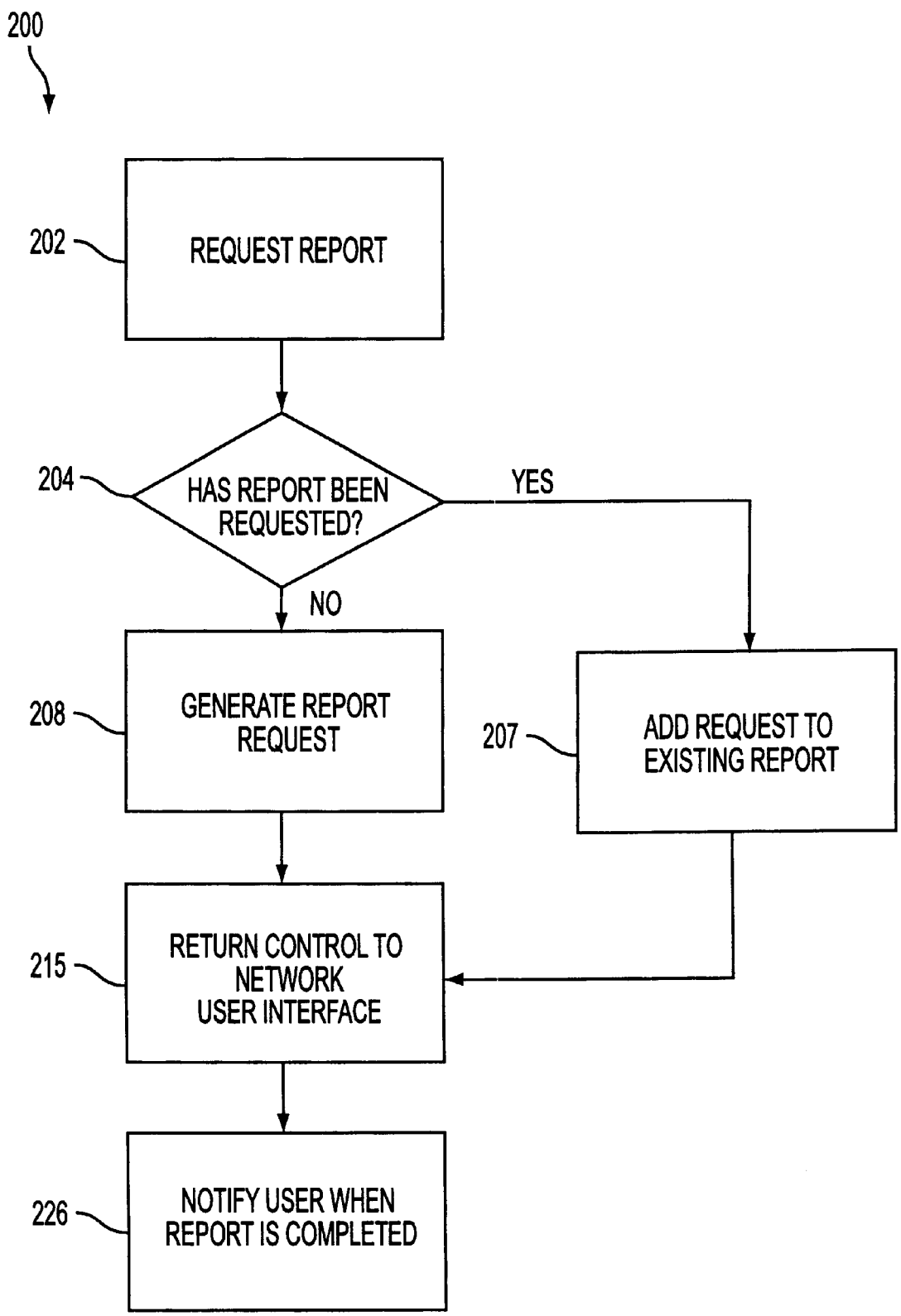
FIG. 1 is a schematic block diagram of a method for generating reports asynchronously in accordance with an embodiment of the invention.

A method 200 may be provided according to an embodiment of the present invention, as depicted in FIG. 1. In this method, a user system providing a user interface module may be connected over a network to an OLAP server system. The first step in method 200 then involves step 202 whereby the user may request the processing of a report to be run on the OLAP system through a web browser or other user interface system. The report may then be transmitted by the web browser or other user interface system to the server system such as a network module in communication with the web server.

After a report has been requested, in step 204, the system compares that report with other pending or recently completed reports for the user submitting the report and for other users connected to the system to determine if the requested report is the same as a pending or processed report. In an embodiment, if a particular report has recently been completed or is already in the queue to be processed by the server system, the system does not create a new report to be processed. Rather, in step 207, the system adds the user to the report that has already been requested so that when the previously requested report completes, then all users that requested that report receive the results. If the report has already completed, then the system immediately returns the results to the user as part of steps 215 and 226. If the report has not been requested, then in step 208, a report request is generated and transmitted to the OLAP processing system.

In step 215, the system returns control of the network interface, such as a web browser or other user interface module, to the user so that the user may perform other tasks. Specifically, the server system may direct the web server to transmit a signal to enable the user to use the web browser to perform other tasks, including submission of another report. The web server may also transmit a page that informs the user that the report that was requested was received and is scheduled for processing, such as a status page as discussed below.

Then, in step 226, the system notifies the user when a report has been completed so that the user may review the results of the report. By returning control of the web browser to the user upon receipt of the report request, the system frees the user to submit multiple reports for processing in an asynchronous manner. Additional details and features of the present invention may be understood with respect to FIGS. 2–7 below.

Figure 2:
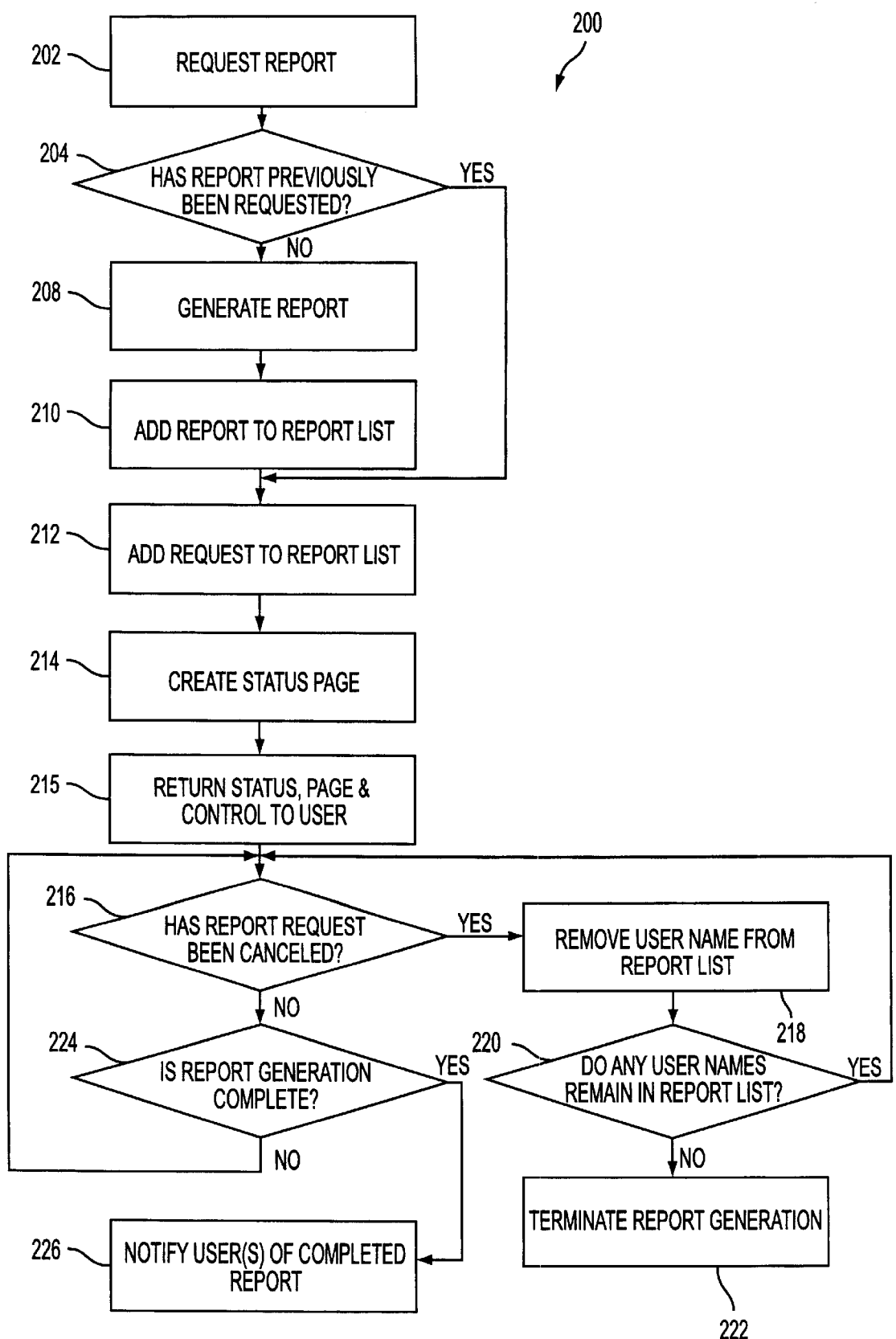
FIG. 2 is a schematic block diagram of a method for generating, monitoring, and canceling reports asynchronously in according with another embodiment of the present invention.

FIG. 2 illustrates a more detailed embodiment of method 200 in accordance with one embodiment of the invention. Specifically, in step 204, the system determines whether that report is the same, substantially the same or similar to a report that has previously been requested. To do so, the system may store or have access to all, or a certain predetermined subset of all, reports forwarded to the system within a predetermined period of time (e.g., several hours, several days, or several weeks).

In an embodiment, the system, in step 204, may compare the name of the report with the name of other reports maintained in a cache that comprise all reports already pending and reports that have been completed but not removed from the cache. Also, the system may compare the template, filter, and user view of a request to the template/filter/user view combination of other requested reports in the cache. If the template/filter/user view combination selected are identical, then the reports may be deemed to be the same.

Also, two reports may also be determined to be the same for purposes of avoiding generating a new report even if the templates or filters are not identical. For example, two reports may be deemed to be substantially the same if the template/filter/user view combination is within a predetermined range of a template/filter combination of a previously run or pending report. For example, if a report for gross sales of running shoes for March, 1999 in the U.S. has been forwarded for processing, it may be determined that a request for gross sales of a particular brand of shoes for March, 1999 in the U.S. is substantially the same or similar enough to be the same report. Other methods of determining similarity of reports to reduce the number of jobs to be processed by the system may also be used.

In step 208, if the report is different from other pending or recently completed reports, then the report is generated by placing the report in the processing queue in a known manner. Additionally, the report may be added to a report list in step 210. The report list may comprise a list of all reports generated within a predetermined period of time and may include pending and completed reports. The report list may contain a report entry for each report containing the names or identifier(s) of system users that have requested that report. The report entry for each report may also contain additional information if desired (e.g., complete request parameters, user id, requests GUID, electronic mail address, employee numbers, metadata user id, project name, report types (prompt or non-prompt), auto-prompt selections, report description, report name, filter name, template name, folder name, requested time, submitted time, completed time, filter details, status and operators used in the report such as (AND. OR, NOT)). Whether the report is new or previously requested, the request by that user is then added to the report entry for the report in step 212. The request entry may include information regarding the user name and/or other identifier that submitted the request, the grid/graph type of the report requested, the time requested, etc.

Figure 4:
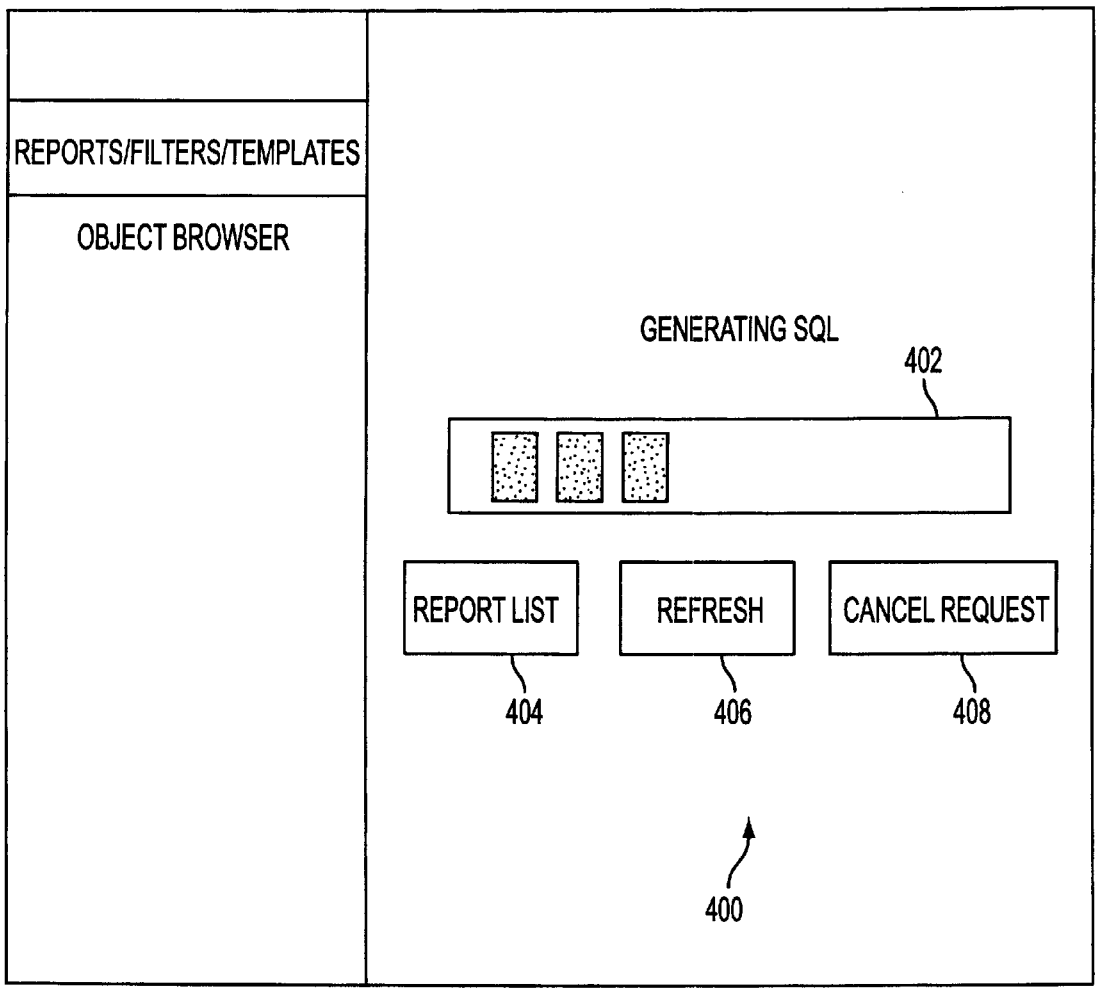
FIG. 4 is a schematic illustration of a status page in accordance with an embodiment of the invention.

It may also be desirable to notify the user of the status of the report request so in step 214, a status page may be generated. Therefore, in step 214, a status page may be generated and presented to the user by the system over the network. The status page may identify the name of the report, date and time submitted, and/or any other additional information. An example of a status page is depicted in FIG. 4. The status page may be displayed as a separate window and may be accessed by the user through viewing a report list for that user as described below. At this point, the system may enable the user to request another report, view old reports or perform other types of actions.

The status page may also enable the user to cancel a particular request, as for example, illustrated in FIG. 4 and described below. The user may also be able to cancel a report from a user report list, as for example, the user report list shown in FIG. 3, such as by clicking on the report entry and selecting a cancel icon, pull-down menu option, or other mechanism for canceling a report.

By treating each report separately and asynchronously, a report may be canceled at any time. As each report may have multiple users that have been added to that report, however, in one embodiment, a report is not canceled from the queue at the system until all users that have been added to that report have canceled. If a user cancels the report, the user's name or id is removed from the report entry for that report and that canceled user then cannot access the report results unless they resubmit another request for the report. The details of this process are depicted in steps 216–226.

Specifically, in step 216, the system determines whether a report request has been canceled. If a report request has been canceled by a user, the system removes the request for that user from the report list in step 218. After removing the user from the report entry for that report, the system, in step 220, determines whether any users remain in the report entry for that canceled report. If any user names remain, method 200 returns to step 216. If no other user names remain in the report entry, the system terminates the report and deletes it from the queue of reports being processed by the server system in step 222.

If, in step 216, a report request has not been canceled, the system determines whether any of the reports are complete in step 224. If a report is complete, in step 226 the system notifies all of the system users identified in the report list for that report that the report has been completed. Notification may be made using e-mail, facsimile, pager, through the web interface such as through the web browser or other user interface module using push technology, etc. or any other mechanism as described below.

If the report generation is not complete, in step 224 the system returns to step 216 to determine whether any report request cancellations have been entered into the system. This continues until the report generation is complete and all systems users are notified that the report generation is complete for all reports on the system. The process may involve polling whereby steps 216 and 224 are performed on a predetermined schedule, such as every seven seconds or so. Other schedules may also be used.

Method 200 provides numerous advantages for generating reports. Receiving report requests and processing those requests asynchronously enables users to operate other applications while a report is being generated. Additionally, by focusing on the identity of the report rather than a request for that report, duplicative report generation is minimized. Therefore, if several users request the same report, only one report is generated.

Figure 3:
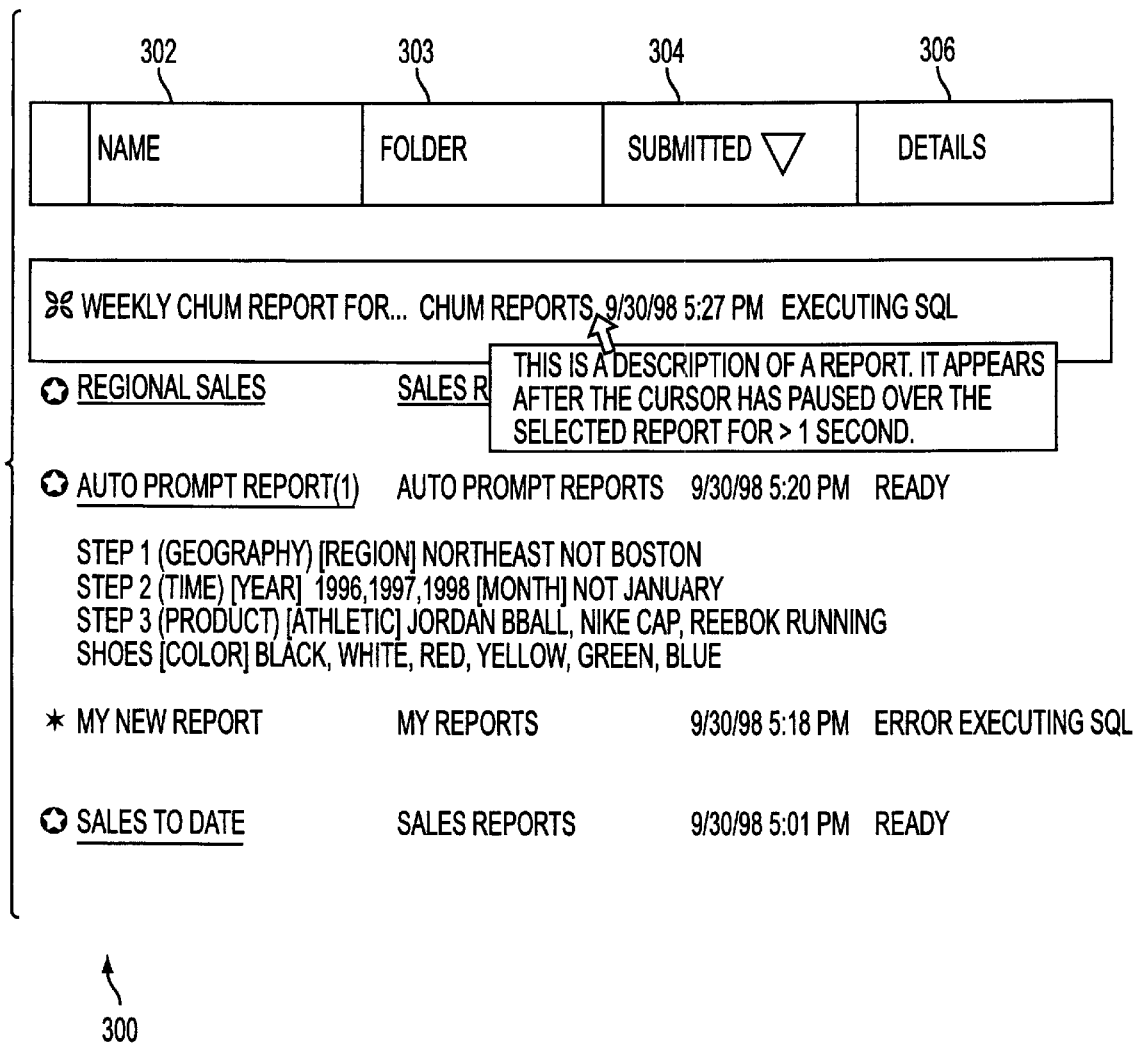
FIG. 3 is a schematic illustration of a report list in accordance with one embodiment of the invention.

FIG. 3 illustrates a user-specific report list 300 in accordance with an embodiment of the invention. Report list 300 may contain a report list for reports submitted for a specific user within a predetermined period of time. That time may be a particular log-in session or a discrete time interval for example. For each report, report list 300 may contain a "name" field 302 which identifies the name of the report being generated. A folder field 303 may be provided for indicating the folder or other category that the report may be organized. A "submitted" field 304 may be used to identify the date and/or time the report request was submitted. Other fields, for example, a "details" field 306 may be used to provide additional information, such as, the status of the report. Fields 302–306 may be sorted according to various criteria (e.g., ascending or descending order) by, for example, clicking on a field using a conventional computer mouse. It is to be understood that report list 300 may be sorted according to the value of a field (e.g., user, date, report, etc.). A status field may also be provided and contain information as described below with respect to FIG. 4. Further, various icons or other symbols may be used to indicate the status or type of report.

As FIG. 3 depicts, various types of reports may be processed according to the present invention and these different report types may be displayed differently in report list 300. For example, an auto-prompt report may be provided with details of the prompting to show the filters, metrics, what information has been drilled on, what was selected in the prompt, other filter details, and other parameters selected for the report.

As discussed above, to notify the user that the request has been received and is being processed, a status page may be presented to the user. A status page may be used to display the progress of a report being generated and a user-specific report list may be viewed.

FIG. 4 illustrates a status page 400 in accordance with one embodiment of the invention. Status page 400 provides a view displaying the current status of a report's execution cycle. The execution cycle identifies the progress of a report generation (e.g., 10% complete, Error, complete with errors, pending, complete, sending request, generating SQL, submitting job request, request in queue, running report, retrieving results, cross-tabbing data, formatting data, report complete, error running report, report canceled, m of n reports completed). Status page 400 may contain a graphical display 402 of the progress of the report generation on a percentage complete basis. Selectable icons may also be displayed within status page 400. For example, a report list icon 404 may be displayed which enables a user to display a report list. A "refresh" icon 406 may be used to manually update the progress of the report generation. As described in further detail below, this operation may be automated and set by a user. Additionally, a "cancel request" icon may be displayed which permits a user to cancel the generation of a requested report.

A refresh status page rate may be set by a system user or by a system administrator. The system maintains a master list of requested reports and stores the list on a server. The master list may be refreshed when caches expire, a report is canceled, or a report is removed from a cache for another reason, etc.

A system administrator master report list may also be provided according to the present invention and enabled through network output module 22. The administrator report list may be similar to user report list 300 but may additionally comprise entries for each report to identify the users that have requested that report. Further, the system administrator report list may comprise all reports run within a predetermined period of time and may be broken out project by project if desired. The report list may provide a mechanism that enables a system administrator to delete entire reports, groups of reports, to delete a particular user or groups of users from a particular report or modify the order of reports in the queue. The administrator may thereby control reports submitted to the server system. In one embodiment, all such reports may be stored in a cache and the master report list may contain all cached reports plus all pending reports.

The information in the history list may include the name of the request, the report display mode (graph or grid), the date and time the request was last submitted, the status of the request, the users who have submitted the request and their identifiers or keys, filter details for report requests, and workbook report names for workbook requests. The administrator may refresh the list, delete a request or view details about a request. The details may include the filters and templates requested.

According to another embodiment of the present invention, users may be able to submit requests for workbooks to be processed by the server system on data in the data warehouse. A workbook may comprise complex reports that generally comprise a plurality of reports and template/filter combinations that are collected to be generated as a large complex report. Therefore, as the term "report" as used herein should be understood to comprise a single template/filter combination run against data in the data warehouse or a collection of such "reports" in a format known as a "workbook."

Generally, to generate a workbook request, the user logs into the server system through username and password combinations. The user interface then presents the user with options for designing a new workbook or modifying an existing workbook. To add a new workbook or modify an existing one, the user identifies the workbook (e.g., by naming it), and then selects one or more predefined reports or template/filter combinations to be included in the workbook. The user also selects the sequence of the reports and template/filter combinations. The server system may present the available reports and template/filter combinations by accessing the data warehouse, as for example, with a ROLAP engine by displaying the available table entries from the relational database structure in the data warehouse. Auto-format and drill-down reports may also be included in a workbook.

A workbook is processed as a collection of reports, with each report being processed and then when all reports in the workbook are complete, the workbook is formulated and the users requesting the workbook are then notified. The reports in a workbook may be processed asynchronously or sequentially depending on the types of reports.

Workbooks may be implemented through leveraging spreadsheet application programs, such as Microsoft Excel™. Through these spreadsheet applications, formatting of multiple reports into a combined workbook may be provided. Accordingly, the programming language in the spreadsheet application may be used to configure the format and arrangement of reports within the workbook. For example, Visual Basic for Applications may be used in the Excel™ spreadsheet software application. This provides flexibility in formatting and combining reports to create new ones and in building an interactive spreadsheet application for the end user. For example, a spreadsheet application for a stock market workbook may provide pull-down menus for selecting different time ranges and industries which then update instantly/dynamically. Because these programming languages and spreadsheet programs, such as VBA and Excel are open standards, they are widely used and therefore, the usefulness of the workbook feature is enhanced.

Also, using Excel™, for example, enables users to select various properties and formatting for the reports that are to be generated. Integration of Excel™ with the invention allows users to use all of the functionality offered in Excel™ and to apply that functionality to the reports generated using the invention. For example, Excel™ offers existing macros that may be used to automate work flow or other features for the reports. Additionally, these macros may be modified or additional macros may be recorded to perform a specific operations desired by a user. The macros may be used, for example, to facilitate work flow. Generating reports in Excel™ also enables reports to display grids and graphs of the same report at the same time, display headers and footers, deliver multiple worksheets in a single workbook, support logical exceptions through use of overwriting rules, allows administrators to create formatted reports, etc.

Figure 5:
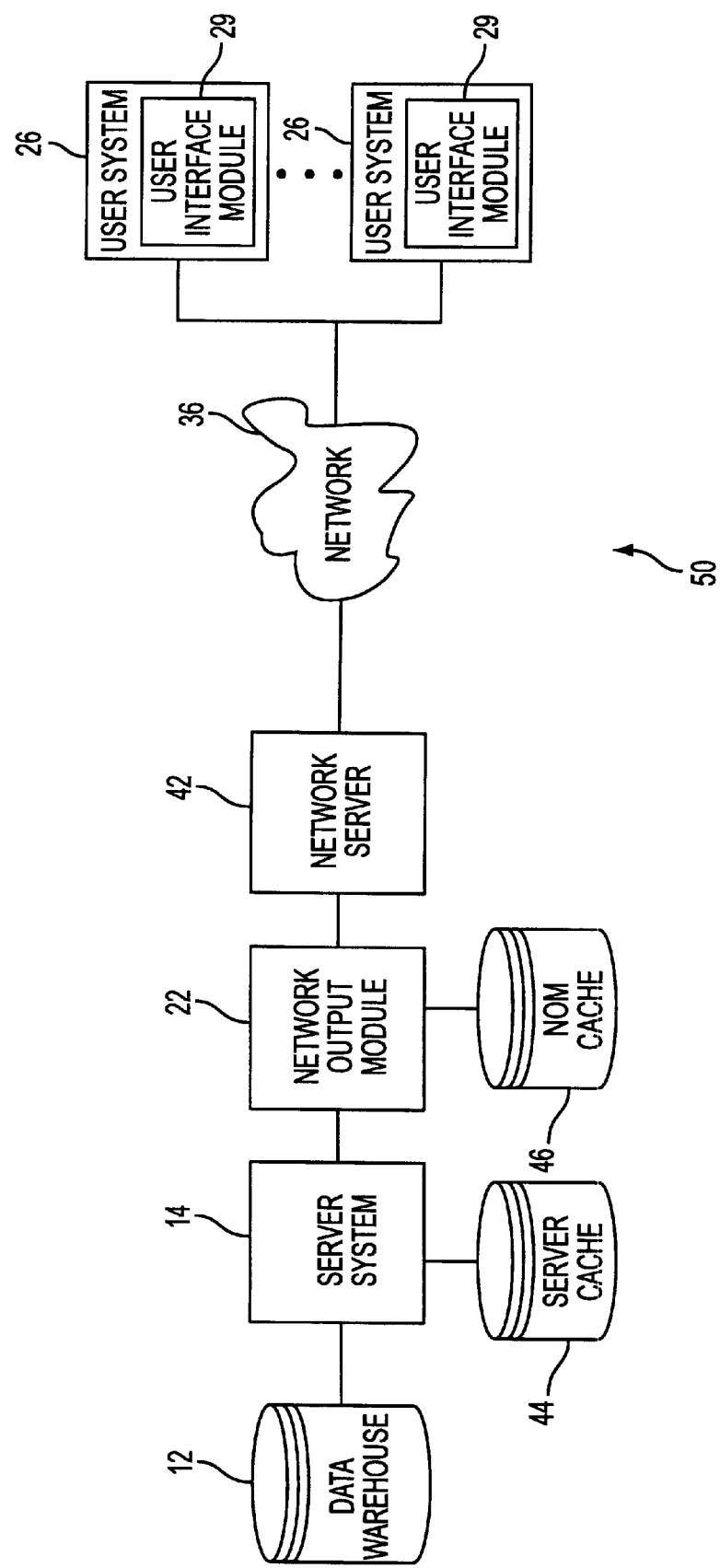
FIG. 5 is a schematic block diagram of an asynchronous report requesting network system in accordance with an embodiment of the invention.

A detailed embodiment of a system for enabling users to asynchronously generate report requests is depicted in FIG. 5. Such a system 50 comprises a data warehouse 12, server system 14, network output module 22, user systems 26, user interface modules 29 and network 36. Additionally, server system 14 may be connected to a server cache 44 and network output module 22 may be connected to a network output module cache 46. Further, a network server 42 may be provided to generate output from network output module 22 across network 36 to user systems 26.

Server cache 44 may be provided to store calculated report results in a relational database structure. By providing a server cache 44 with server system 14, complex business reports may be accessed with one simple server request statement rather than having to access data warehouse 12 each time that a complex business report is requested. Additionally, through the use of server cache 44, load balancing may be provided. Further, for security purposes, server cache 44 may be used to index result tables by filter/template combination and by user.

Network output module cache 46 may be provided to store dynamic web pages created to display report results in files through network server 42. Cache results in network output module 46 may retain links to data warehouse content for ad hoc reporting and drilling.

Various security level architectures may be employed, although not depicted in FIG. 5. For example, a database level security may be provided between data warehouse 12 and server system 14. A network security user validation module may be provided between network output module 22 and network server 42. Further, firewall and data encryption techniques may be provided within network 36 to prevent access to network server 42 from unqualified or unauthorized user systems 26. Also, an API may be provided to enable creation of further security level clearances to prevent user systems 26 access to data and data warehouse 12 for server cache 44 to which they do not have authorization.

Operation of system 50 may now be described. System 50 may enable users to request reports from server system 14 to be processed against data warehouse 12 through the use of a user interface module, such as a web browser operatively connected over the Internet to a network output module 22. As such a report may be requested by a user through user interface module 29 of user system 26.

To access the data warehouse, a user may first log in to network server 42 via user system 26. The user may do so by selecting a particular web site maintained by network server 42 or some other mechanism may be used. Network server 42 then presents the user with a view using user interface module 29 (e.g., a web browser) comprising one or more options. A view may comprise a page or series of pages from a website, for example. One option presented in the view may be a mechanism that enables a user to generate a report request through this mechanism in the view. User interface module 29 may be used to submit a request for a report selected by the user to network server 42 over network 36. Network server 42 communicates the request to network output module 22. Network output module 22 receives the request and formulates a report request to be sent to server system 14 for processing using data warehouse 12. Network output module 22 may also perform other steps, as described in detail below with respect to FIG. 3. Network output module 22 may also cooperate with an agent module operatively connected over system 50 to formulate a report. Server system 14 then accesses data warehouse 12 to perform all data retrieval and calculations to provide the report.

Network output module 22 may provide the functionality to determine whether a report request is the same or substantially the same as a previously requested report prior to forwarding a report to server system 14 for processing. Upon receipt of a report request, network output module 22 also controls network server 42 to present a new view to the user through user interface module 29 via network 36 while continuing to monitor progress of submitted reports identified for the particular user. This enables users to perform other tasks and thereby provides the asynchronous nature of the present invention. For example, the user may operate other views, pages, sites or any other action using user interface module 29, without having to wait for the report generation to be complete before being able to do so.

After the report generation is complete, server system 14 communicates the report to network output module 22. Network output module 22 prepares the report for presenting to the user(s) that requested the report using user interface module 29. As such, network output module 22 controls asynchronous processing of reports requested by the users.

Figure 6:
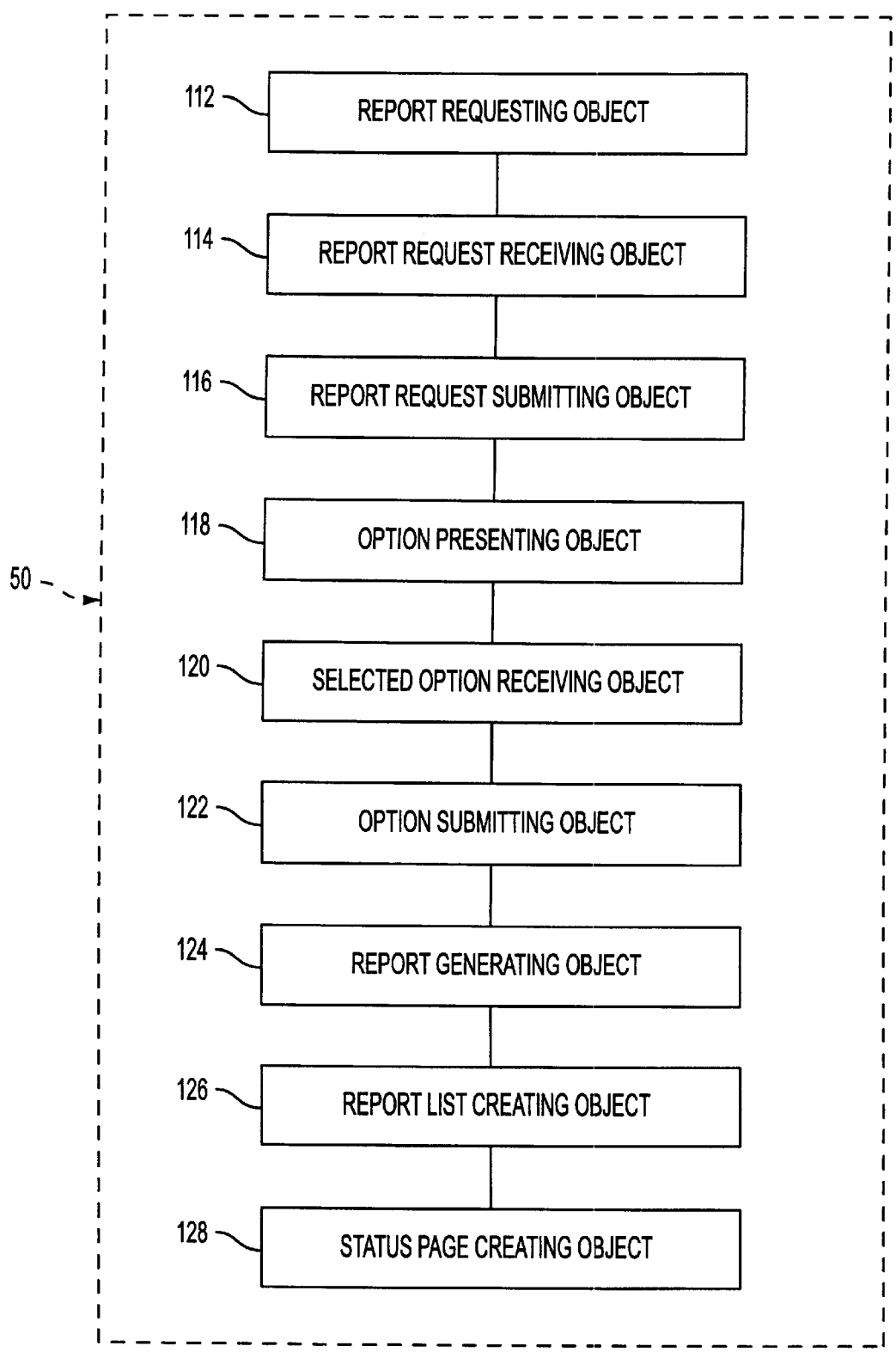
FIG. 6 is a schematic block diagram of system components in accordance with an embodiment of the invention.

FIG. 6 illustrates various components and objects of system 50 that perform tasks and functions described above. These objects may reside anywhere within system 50, but the location of each according to one embodiment is described as well. System 50 comprises a report requesting object 112, a report request receiving object 114, a report request submitting object 116, an option presenting object 118, a selected option receiving object 120, and a selected option submitting object 122. Report requesting object 112 communicates with report request receiving object 114 to enable a user to request a report to be generated. Report requesting object 112 may comprise functionality provided in a web page presented through user interface module 29. Report request receiving object 114 may comprise a module that is a portion of network output module 22. Report request submitting object 116 submits the user's report request for generation. Report request submitting object 116 may comprise an object that is a portion of network output module 22. Server system 14 then accesses data warehouse 12 to perform all data retrieval and calculations to provide the report.

Network output module 22 may provide the functionality to determine whether a report request is the same or substantially the same as a previously requested report prior to forwarding a report to server system 14 for processing. Upon receipt of a report request, network output module 22 also controls network server 42 to present a new view to the user through user interface module 28 via network 36 while continuing to monitor progress of submitted reports identified for the particular user. This enables users to perform other tasks and thereby provides the asynchronous nature of the present invention. For example, the user may operate other views, pages, sites or any other action using user interface module 28, without having to wait for the report generation to be complete before being able to do so.

After the report generation is complete, server system 14 communicates the report to network output module 22. Network output module 22 prepares the report for presenting to the user(s) that requested the report using user interface module 28. As such, network output module 22 controls asynchronous processing of reports requested by the users.

FIG. 6 illustrates various components and objects of system 50 that perform tasks and functions described above. These objects may reside anywhere within system 50, but the location of each according to one embodiment is described as well. System 50 comprises a report requesting object 112, a report request receiving object 114, a report request submitting object 116, an option presenting object 118, a selected option receiving object 120, and a selected option submitting object 122. Report requesting object 112 communicates with report request receiving object 114 to enable a user to request a report to be generated. Report requesting object 112 may comprise functionality provided in a web page presented through user interface module 28. Report request receiving object 114 may comprise a module that is a portion of network output module 22. Report request submitting object 116 submits the user's report request for generation. Report request submitting object 116 may comprise an object that is a portion of network output module 22.

After a request has been submitted, option presenting object 118 may present various options for the report. Selected option receiving object 120 communicates with option presenting object 118 to select the option(s) selected by the user. Options may include specification of the name, content, project, filter, template and other components of a report as may be used by server system 14. Selected option submitting object 122 then submits the options selected by the user for processing. A report generating object 124 generates the requested report asynchronously based on the options selected by the system user. A report list creating object 126 creates a report which lists one or more reports requested. If a request for a report that has already been requested, network output module 22 adds a request to the report entry, including an identification of the system user requesting the report, without generating another report. A status page creating object 128 creates a status page which identifies the status of one or more requested reports. The status page may include options which may be selected by the system user (e.g., cancel request). Option presenting object 118 and selected option submitting object 122 may comprise functionality presented in a page to the user via user interface module 28. Other objects described may comprise components of network output module 22.

Through an administrator module within network output module 22, an administrator may also monitor performances of each report, filter reports by pending, error and completed requests, cancel or modify reports, and may resubmit a report if it creates an error. The administrator module may have restricted access to prevent users from canceling other user requests. The administrator module may also allow for setting global settings for the system. Further, the administrator module may also enable administrators to view history lists, status lists, and cancellation pages from the viewpoint of users on the system. This enables administrators to be able to see what the user is seeing and therefore, troubleshoot or answer questions about the performance and operation of the system.

As described above, therefore, the present invention provides the ability for users and system administrators to cancel report requests. If a user desires to cancel a report request, the user may submit a report request cancellation by, for example, clicking on a "cancel" button using a conventional computer mouse or by selecting "cancel" from a standard pull-down menu. After a report request cancellation has been submitted, the system removes the request for that user from the report entry in the report list and then determines whether any other requests by other users remain in the report entry for that report. If the report entry contains additional user names, the system continues generating the report. This method enables users to cancel respective report requests while continuing report generation for other system users. Additionally, this reduces system overhead by generating a single report for multiple requests. For example, if several users request the same report, only one report will be generated unlike prior systems where reports are generated for each request submitted by a user. For example, if ten users submitted a single request for the same report, ten reports would be generated. The invention, however, generates only one report that is used for each of the requests submitted by the ten (10) system users.

Another feature of the invention enables notification to a system user of a completed report. Once a report is generated, the system notifies the user that requested the report via e-mail, telephone, fax, pager, or other method that the report is completed. This may be done using known broadcast technology. For example, the invention may use Microstrategy's DSS Broadcaster™ to implement this notification feature.

Users may request and format reports generated using standard spreadsheet software using a network interface device (e.g., a web browser). The web browser may be, for example. Microsoft Internet Explorer™, Netscape Navigator™, etc. Use of a web browser allows users to easily manipulate and generate reports without requiring the user to have a specific application based on the user system.

Figure 7:
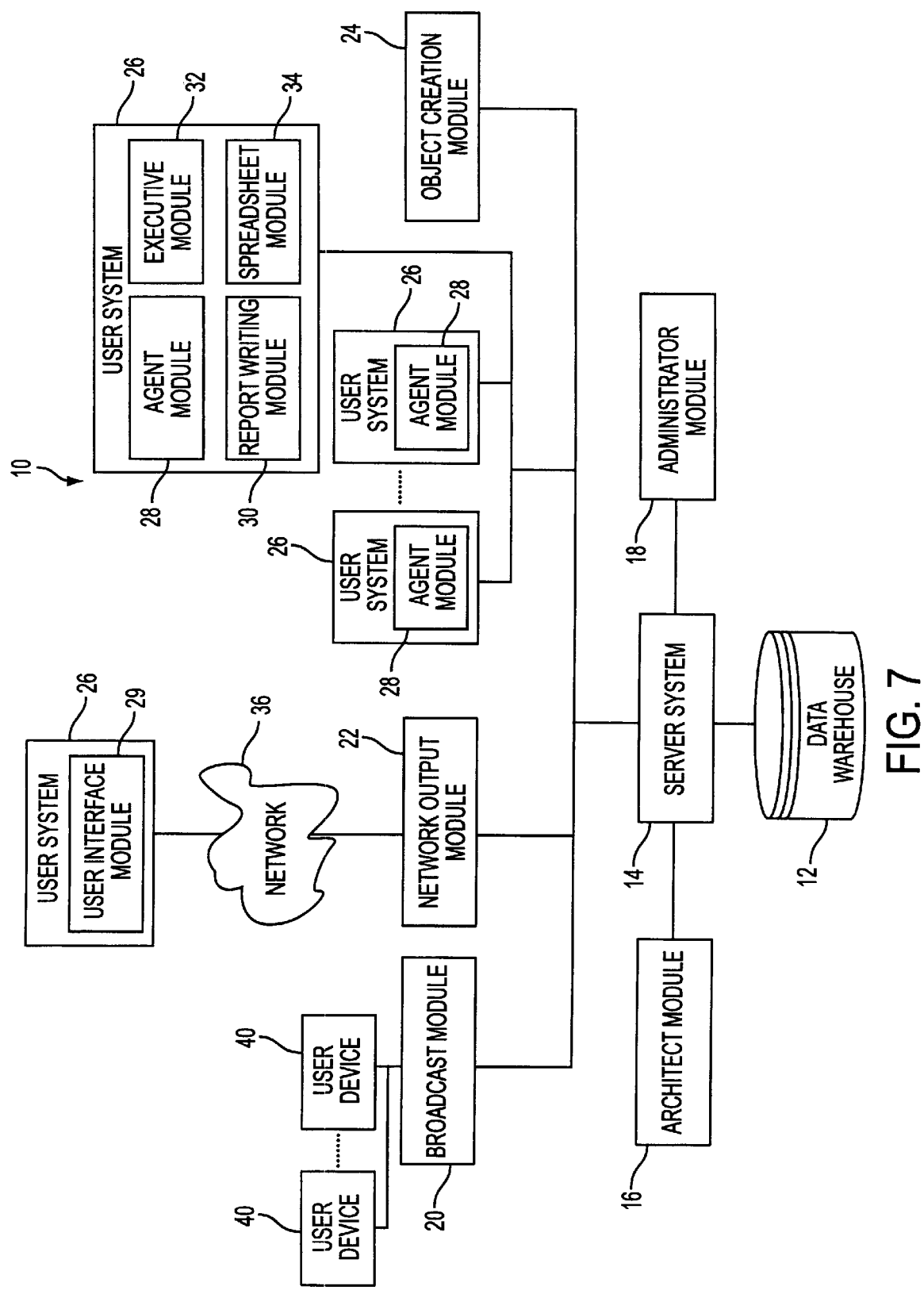
FIG. 7 is a schematic block diagram of a network-based system in which the asynchronous report generation system may operate in accordance with one embodiment of the invention.

The present invention may be used in an overall system comprising a plurality of other systems for OLAP and decision support. According to one embodiment of the invention, a decision support system 10 may be provided as depicted in FIG. 7. System 10 may comprise a data warehouse 12, a server system 14, an architect module 16, an administrator module 18, a broadcast module 20, a network output module 22, a plurality of user systems 26, and an object creation module 24. Data warehouse 12 may comprise any data warehouse or data mart as is known in the art, including a relational database management system ("RDBMS") or a multidimensional database management system ("MDBMS") or a hybrid of the two. As discussed above, data warehouse 12 consolidates source system transaction data, organizes that data by business subject areas called dimensions and often includes data history for long term periods, such as two to five years. A data mart includes dimensions which tend toward application-specific subjects instead of integrating the entire business in one database such as departmental analysis data, data mining, and mass mailing lists.

Server system 14 comprises an OLAP server system for accessing and managing data stored in data warehouse 12. Server system 14 may comprise a ROLAP engine, MOLAP engine or a HOLAP engine according to different embodiments. Specifically, server system 14 may comprise a multithreaded server for performing sophisticated analysis directly against data warehouse 12. One embodiment of server system 14 may comprise a ROLAP engine known as DSS Server™ offered by MicroStrategy.

Architect module 16 may comprise a module that enables developers to create and maintain data and metadata in data warehouse 12. Metadata may be considered to be data about data, such as data element descriptions, data type descriptions, attributes/property descriptions, range/domain descriptions, and process/method descriptions. Data and metadata stored in data warehouse 12 may thus be modified and organized by architect module 16. According to one embodiment of the invention, architect module 16 may comprise a software package known as DSS Architect™ offered by MicroStrategy.

Administrator module 18 may comprise a module for facilitating the development, deployment and management of data warehouse applications supporting large volumes of users over various distribution mechanisms. Administrator module 18 may comprise an object manager and a warehouse monitor. The object manager allows objects to be shared across databases for easy migration from development to production. The warehouse monitor provides performance monitoring and management tools to support thousands of users across a distributive database environment. The warehouse monitor collects statistics for the purpose of identifying performance bottlenecks, warehouse tuning, and cost analysis. According to one embodiment of the invention, administrator module 18 may comprise a module known as DSS Administrator™ offered by MicroStrategy.

Server system 14 also connects to an object creation module 24. Object creation module 24 may comprise a component object model ("COM") application program interface ("API") for custom decision support development. According to one embodiment of the invention, object creation module 24 may comprise a software module known as DSS Objects™ offered by MicroStrategy. Additionally, custom applications may interface with object creation module 24 including Delphi, Visual Basic, and C++ programming modules.

Server system 14 also interfaces with a number of devices that enable users to access the contents of the data warehouse to perform various data analyses. One embodiment of such a system comprises a user system 26 with an agent module 28 operating thereon. Agent module 28 may comprise a decision support interface to enable a user to provide integrated query and reporting, powerful analytics, and decision support through any standard user system 26.

Agent module 28 may operate on any user system including personal computers, network workstations, laptop computers or any other electronic device connected to server system 14. Agent module 28 may enable the user to define queries to be performed against the data contained in data warehouse 12 using components, templates, filters, reports, agents, etc. Components may include dimensions, attributes, attribute elements, and metrics; in other words, the building blocks for templates, filters, and reports. Templates generally define a report format and specify the attributes, dimensions, metrics, and display properties comprising a report. Filters generally qualify report content and identify the subset of data warehouse 12 to be included in a report. Reports are generally understood to be a data analysis created by combining a template (the format) with a filter (the content). Agents are a group of reports cached on a time—or event—based schedule for rapid retrieval and batch processing.

Accordingly, agent module 28 enables a user access to the contents of data warehouse 12 to provide detailed analysis on an ad hoc basis. According to one embodiment of the invention, agent module 28 may comprise a software package known as DSS Agent™ offered by MicroStrategy. One of the advantages of DSS Agent™ includes its use of a ROLAP architecture on server system 14 and a RDBMS in data warehouse 12 to provide a more scaleable environment. Through DSS Agent™, a user can "drill down" which allows the user to dynamically change the level of detail in a report. Drilling down allows the user to drill to a lower level attribute so that the resulting report displays data with a greater level of detail. For example, one can drill down from year to month to week to day. DSS Agent™ also enables users to "drill up" to a higher level attribute. Drilling up summarizes the selected data to a higher level total. For example, one can drill from day to week to month to year. DSS Agent™ also enables a user to "drill within." Drilling within allows a user to go to a different hierarchy within the same dimension. Drilling within is often used to examine the characteristics of selected data. For example, drilling within enables a user to drill from item to color when looking at a particular retail item such as an automobile, clothing or the like. Drilling across allows the user to drill to an altogether different dimension or subject area. For example, one can drill across from a region to a month. Accordingly, through use of agent module 28, server system 14, and data warehouse 12, drilling is a powerful tool that is easily implemented using a ROLAP architecture which is not as easily accessible in MOLAP unless a user also implements the complicated structure of a HOLAP architecture.

Along with agent module 28, user system 26 may also include a report writing module 30, an executive module 32, and a spreadsheet module 34. Report writing module 26 may comprise an OLAP report writer. Executive module 32 may comprise a module design tool for developing custom EIS applications. This module is a design tool for developing briefing books that provide high level users with a series of views that describe their business. Once created, end users can access briefing books through agent module 28 in EIS mode. Such a system is easily implemented with agent module 28 by compiling sets of analyses into dynamic pages that immediately focus users on their key business drivers. One embodiment of executive module 32 may comprise the software made DSS Executive™ offered by MicroStrategy.

Spreadsheet module 34 may comprise an add on to existing spreadsheet programs or may comprise an entirely new spreadsheet program. Spreadsheet module 34 may enable reports and analyses generated from agent module 28 to be presented in a traditional spreadsheet program format to enable users to view results in preexisting front end interfaces. Spreadsheet module 34 may comprise the Microsoft Excel™ spreadsheet program offered by Microsoft and an Excel™ Add-In program offered by MicroStrategy.

Another module for accessing content of server system 14 may comprise a network output module 22. Network output module 22 offers the advantage of enabling user system 26 access to server system 14 in data warehouse 12 without requiring an additional agent module 28 to be stored on user system 26. Instead, user system 26 may have a user interface module 38 residing on user system 26. User interface module 38 may comprise any module that enables a user system to interface with the network output module over a network 36. According to one embodiment of the invention, network 36 may comprise an intranet or the Internet or other developed Internet-type networks. Further, user interface module 38 may comprise any standard browser module such as Microsoft Internet Explorer™ or Netscape Navigator™. As most user systems 26 already have a user interface module 38 stored and operating thereon, network output module 22 offers the advantage of enabling users access to server system 14 in data warehouse 12 without learning to operate a new module such as agent module 28. One embodiment of network output module 22 may comprise a web-based module called DSS Web™ offered by MicroStrategy. Accordingly, in one embodiment, a user can access server system 14 through a standard web browser, such as Microsoft Internet Explorer™, over the Internet through network output module 22, such as DSS Web™.

In this embodiment, network output module 22 may comprise a World Wide Web tool used in conjunction with server system 14 for allowing users to deploy data warehouse/decision support applications over the Internet using industry standard World Wide Web browsers as a client. As a result, a user can access the data warehouse with little or no client maintenance, little or no software to install, and only a small amount of additional training while still maintaining all of the capabilities of agent module 28. One embodiment of such a network output module 22 comprises DSS Web™ offered by MicroStrategy. Such an embodiment provides a broad array of options for viewing information sets, such as spreadsheet grids and a wide variety of graphs. Through this module's exceptional reporting capabilities, users receive key elements of a report in easily interpretable, plain messages. This module also allows users to "drill" dynamically to a lower level of detail to view the underlying information or to create and save new analyses. For sensitive information, this module provides security plug-ins that allow the user to extend the standard security functionality with additional user authentication routines. This module may also provide an interface API that allows users to customize, integrate, and imbed this functionality into other applications. For example, the data syndicator for health care information could utilize this module with a customize interface to sell access to health care information to Health Maintenance Organizations, hospitals, and pharmacies.

Another module that enables user access to the data warehouse 12 comprises a broadcast module 20. Broadcast module 20 may comprise an information broadcast server designed to deliver personalized messages to multiple recipients via user devices 40. User devices 40 may comprise electronic mail, facsimile, pager, mobile phone, telephone, and multiple other types of user information devices. Broadcast module 20, like agent module 28 and network output module 22, enables users to define queries and reports that are to be run against server system 14 and data warehouse 12. Broadcast module 20 may then send personalized information to users at predefined intervals or when criteria specified in their reports exceed predefined thresholds. Broadcast module 20 may continually monitor and run such reports to enable users to receive appropriate information as it becomes available. Broadcast module 20 may also personalize the report to ensure that users see only that portion of a report that is relative to that user and thereby frees analysts from acting as the information provider. Broadcast module 20 may also provide a wide range of content formatting options to enable users to receive information in a form that they can best understand. One such formatting may include formatting a request for a pager, facsimile, mobile phone, electronic mail, web or other output user device 40.

Broadcast module 20 may specify a mechanism called a service for generating information and a subscription that determines which users receive information from which service. Accordingly, a service may be tied to, for example, a specific report, series of reports or elements within a report, etc. Also, subscribers may include users, groups of users or only specific user devices 40 for a particular user. Broadcast module 20 may output information to user devices 40 using push technology. In other words, as soon as a criteria is established, broadcast module 20 generates a report to a user device 40. Accordingly, a user can thus have up-to-date information about the contents of data warehouse 12 without having to submit a query or log-in to a software module such as agent module 28 or network output module 22 to initiate the query.

In such an overall system, the present invention may enable asynchronous report generation through operation of network output module system 22 as described above. Other embodiments and uses of the invention will be apparent to those skilled in the art from consideration of the specification and practice of the invention disclosed herein. The specification and examples should be considered exemplary only. The scope of the invention is only limited by the claims appended hereto.

What is claimed is:

1. A network-based system for enabling users connected via a network user interface over the network to an OLAP system to asynchronously submit requests for reports through a single instance of the network user interface to be processed by an OLAP system, the network-based system comprising:

a network server module that interacts with network user interfaces operating on user systems to enable communications between the network-based system and the network user interfaces;

report receiving means for receiving a first request from an instance of the network user interface for the OLAP system to process a report;

control means for returning control to the instance of the network user interface to enable the user to utilize the same instance of the network user interface to enter a second request through the instance of the network user interface while the first request is being processed; and on-line analytical processing means for generating requested reports.

2. The network-based system of claim 1 wherein the control means enables users to submit multiple reports asynchronously through the same instance of the network user interface.

3. The network-based system of claim 1 further comprising a report list presentation means for transmitting a report list to the network user interface, wherein the report list includes information about one or more reports that the user has requested.

4. The network-based system of claim 3 further comprising a report selection means for presenting a selection object that enables a user to select a report on the report list and for presenting more detailed information about that report in response to the selection.

5. The network-based system of claim 4 wherein the report selection means enables a user to return to the report to modify the report for re-submission.

6. The network-based system of claim 3 wherein the report presentation means enables a user to cancel a report from the report list.

7. A network-based system for enabling users connected via a network user interface over the network to an OLAP system to asynchronously submit requests for reports to be processed by an OLAP system, the network-based system comprising:

report receiving means for receiving a request from an instance of the network user interface for the OLAP system to process a report;

storage means for storing a report entry for reports that have been requested, including reports requested by other users and reports that are being processed;

report control means for adding a request by that user to the report entry of a particular report in the report list if the report requested by the user is substantially the same as that particular report contained in the report list so that a report is processed once and a result from the report is provided to each user making a request for that report; and on-line analytical processing means for generating requested reports.

8. The network-based system of claim 1 further comprising report control means for comparing a request from the user to existing report requests to avoid duplicating reports.

9. The network-based system of claim 1 further comprising cancellation receiving means for receiving a cancellation request from a user to cancel a report that the user has previously requested and still being processed and for canceling the user's request for that report before or during processing of that report.

10. The network-based system of claim 1 further comprising a status presentation means for transmitting status information to the user over the network related to a request for a report that the user has submitted.

11. The network-based system of claim 1 further comprising notification means for notifying the user when a requested report has completed.

12. The network-based system of claim 1 further comprising multi-user report list maintenance and presentation means for maintaining a multi-user report list containing a report entry for reports requested by one or more of a plurality of users and presenting that multi-user report list.

13. The network-based system of claim 12 wherein the multi-user report list maintenance and presentation means enables authorized users to cancel reports in the multi-user report list.

14. The network-based system of claim 1 wherein the report receiving means comprises workbook request means for receiving a request to process a workbook for a user.

15. The network-based system of claim 1 wherein the OLAP system is a relational OLAP system.

16. The network-based system of claim 15 wherein the control receiving means, control means and on-line analytical processing means comprise components of a server system of the ROLAP system.

17. A method of asynchronously processing requests for reports to be processed by an OLAP system submitted from a single instance of a user interface connected over a network to the OLAP system comprising steps of:

receiving a request from an instance of a user interface for the OLAP system to process a first report, wherein the request is received from a report request system that prevents user report requests from being entered through the instance of the user interface upon transmission of a report request;

placing the report request in line to be processed;

returning control to the instance of the user interface to enable the user to utilize the same instance of the user interface to enter a second report request through the same instance of the user interface while the first request is being processed; and processing requested reports on the OLAP system.

18. The method of claim 17 further comprising the step of transmitting a report list to the user, wherein the report list includes information about one or more reports that the user has requested.

19. The method of claim 18 further comprising the step of enabling a user to return to the report to modify the report for re-submission.

20. The method of claim 18 further comprising the step of enabling a user to cancel a report from the report list.

21. The method of claim 17 further comprising the steps of:

storing a report list containing a report entry for reports requested; and adding a user to the report entry for a particular report in the report list if the report requested by the user is substantially the same as that particular report in the report list so that a report is processed once and delivered to the users requesting that report.

22. The method of claim 17 further comprising the steps of:

enabling a user to cancel a request for a report; and canceling the user's request for the report while that report is still being processed.

23. The method of claim 17 further comprising the step of notifying the user when a requested report has completed.

24. The method of claim 17 further comprising the steps of:

maintaining a multi-user report list containing a report entry for reports requested by one or more of a plurality of user;

presenting that multi-user report list; and enabling cancellation of reports by authorized users through the multi-user report list.

25. The method of claim 17 wherein the requested report comprises a workbook.

26. The method of claim 17 wherein the OLAP system is a relational OLAP system.

27. A network-based system for enabling users to asynchronously submit requests for reports to be processed by an OLAP system through a single instance of a browser, the network-based system comprising a user interface module operatively connected over a network to a server system, the user interface module comprising:

a user interface presentation module that presents a user with a view for each instance of the user interface;

a report requesting means for enabling a user to request a report to be processed by the OLAP system through a view of an instance of the user interface;

report request transmission means for transmitting the request to the server system and preventing user report requests from being entered through the instance of the user interface module; and control means for receiving a signal from the server system to enable entering of a second report request through the instance of the user interface module to enable the user to utilize the instance of the user interface module to perform other tasks while the first requested report is being processed.

28. The user interface module of claim 27 further comprising report list presentation means for presenting a report list to the user, wherein the report list includes information about one or more reports that the user has requested.

29. The user interface module of claim 27 further comprising cancellation means for enabling a user to cancel a report request prior to completion of processing of the report.

30. A computer usable medium having computer readable program code embodied therein for enabling users connected over a network to an OLAP system to use a single instance of a network user interface to asynchronously request reports to be processed by the OLAP system, the medium comprising:

computer readable program code for causing a computer system to interact with network user interfaces operating on user systems to communicate with the network user interfaces;

computer readable program code for causing a computer system to receive requests from an instance of the user interface for the OLAP system to process reports, wherein the request is received from a report request system that prevents user report requests from being entered through the instance of the user interface upon transmission of a report request;

computer readable program code for causing a computer system to return control to the instance of the user interface to enable the user to utilize the same instance of the user interface to perform other tasks, including entering of a second report request through the same instance of the user interface while the first request is being processed; and computer readable program code for causing a computer system to process requested reports on the OLAP system.

* * * * *

UNITED STATES PATENT AND TRADEMARK OFFICE
CERTIFICATE OF CORRECTION

PATENT NO. : 6,279,033 C1
DATED : October 14, 2003
INVENTOR(S) : Selvarajan et al.

It is certified that error appears in the above-identified patent and that said Letters Patent is hereby corrected as shown below:

Title page,
Item [73], Assignee, delete "Foothill Capital Corporation, Santa Monica, CA (US) and insert therefor -- MicroStrategy, Inc., Vienna, VA (US) --

Signed and Sealed this

Tenth Day of May, 2005

JON W. DUDAS
*Director of the United States Patent and Trademark Office*

(12) EX PARTE REEXAMINATION CERTIFICATE (4866th)
United States Patent
Selvarajan et al.

(10) Number: US 6,279,033 C1
(45) Certificate Issued: Oct. 14, 2003

(54) SYSTEM AND METHOD FOR ASYNCHRONOUS CONTROL OF REPORT GENERATION USING A NETWORK INTERFACE

(75) Inventors: Inbarajan Selvarajan, Falls Church, VA (US); Damon W. Smith, Arlington, VA (US); Lee C. Harold, Arlington, VA (US); Ali Alavi, Falls Church, VA (US)

(73) Assignee: Foothill Capital Corporation, Santa Monica, CA (US)

Reexamination Request:
No. 90/006,210, Jan. 25, 2002

Reexamination Certificate for:
Patent No.: 6,279,033
Issued: Aug. 21, 2001
Appl. No.: 09/321,830
Filed: May 28, 1999

(51) Int. Cl.[7] .............................................. G06F 13/00
(52) U.S. Cl. ...................................... 709/217; 709/219
(58) Field of Search ................................ 707/1, 2, 3, 4, 707/5, 6, 7, 8, 9, 10, 500, 501.1, 513; 345/700, 748, 760, 778, 736, 737, 738, 739

(56) References Cited

U.S. PATENT DOCUMENTS

| | | |
|---|---|---|
| 5,604,528 A | 2/1997 | Edwards et al. |
| 5,692,181 A | 11/1997 | Anand et al. |
| 5,724,525 A | 3/1998 | Beyers, II et al. |
| 5,740,429 A | 4/1998 | Wang et al. |
| 5,758,088 A | 5/1998 | Bezaire et al. |
| 5,758,351 A | 5/1998 | Gibson et al. |
| 5,765,028 A | 6/1998 | Gladden |
| 5,787,278 A | 7/1998 | Barton et al. |
| 5,852,819 A | 12/1998 | Beller |
| 5,864,827 A | 1/1999 | Wilson |
| 5,867,153 A | 2/1999 | Grandcolas et al. |
| 5,872,921 A | 2/1999 | Zahariev et al. |
| 5,893,905 A | 4/1999 | Main et al. |
| 5,918,225 A | 6/1999 | White et al. |
| 5,918,232 A | 6/1999 | Pouschine et al. |
| 5,933,816 A | 8/1999 | Zeanah et al. |
| 5,940,818 A | 8/1999 | Malloy et al. |
| 5,943,677 A | 8/1999 | Hicks |
| 5,946,711 A | 8/1999 | Donnelly |
| 5,956,693 A | 9/1999 | Geerlings |
| 5,963,641 A | 10/1999 | Crandall et al. |
| 5,974,441 A | 10/1999 | Rogers et al. |
| 5,983,262 A * | 11/1999 | Kukkal ........................ 709/204 |
| 6,012,066 A | 1/2000 | Discount et al. |
| 6,012,083 A | 1/2000 | Savitzky et al. |
| 6,023,714 A | 2/2000 | Hill et al. |
| 6,038,561 A | 3/2000 | Snyder et al. |
| 6,047,327 A | 4/2000 | Tso et al. |
| 6,049,812 A * | 4/2000 | Bertram et al. ............. 715/516 |
| 6,078,924 A | 6/2000 | Ainsbury et al. |

(List continued on next page.)

OTHER PUBLICATIONS

Complaint For Patent Infringement, Oct. 30, 2001 (Exhibits 1–2).

(List continued on next page.)

*Primary Examiner*—Robert B. Harrell

(57) ABSTRACT

An OLAP system with decision support technology for enabling a user to asynchronously generate report requests through a web browser or other user interface module connected over a network to the OLAP system. Once the request is received by the server, the web browser is freed to enable the user to conduct other activities including the requesting of other reports while the first requested report is processing. The server maintains a list of reports requested. With each request for a report received, the system determines whether a similar report has been requested and either generates the report if the report has not been previously requested or adds a request by that user to a report list of a report that has been previously requested without processing the report again. If the requested report was already completed, the results are immediately returned to the user. The report list may be used to display the status of reports requested and provide a system user with various options relating to the reports being generated (e.g., cancel, refresh).

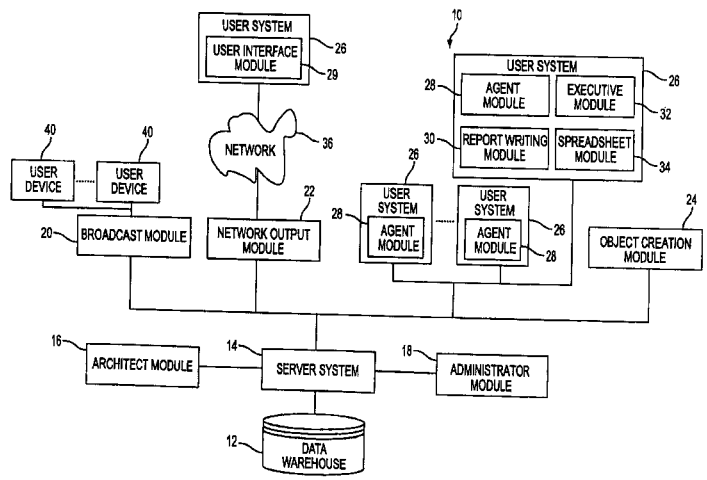

U.S. PATENT DOCUMENTS

| | | | |
|---|---|---|---|
| 6,078,994 | A | 6/2000 | Carey |
| 6,122,628 | A | 9/2000 | Castelli et al. |
| 6,122,636 | A | 9/2000 | Malloy et al. |
| 6,279,033 | B1 | 8/2001 | Selvarajan et al. |

OTHER PUBLICATIONS

Answer And Counterclaims Of Defendants Business Objects S.A. And Business Objects Americas, Inc., Dec. 20, 2001.

Plaintiff Microstrategy Incorporated's Reply To Defendant's Counterclaim, Dec. 28, 2001.

Response Of Business Objects Americas, Inc. To Microstrategy Incorporated's First Set Of Interrogatories, Feb. 22, 2002.

Expert Report Of Walter G. Rudd Regarding U.S. Pat. No. 6,279,033, Apr. 18, 2002 (Exhibits A–F & Exhibits 1–11).

Expert Report Of Jack D. Grimes, Ph.D. On The Validity Of U.S. Pat. No. 6,279,033 , May 20, 2002.

Rebuttal Expert Report Of Walter G. Rudd Regarding U.S. Pat. No. 6,279,033, June 4, 2002.

Order And Opinion, Jun. 12, 2001.

"Sterling Software annouces alliance with Thinking Machines Corporation" Business Wire, Dec. 16, 1996.

"Andyne's Intranet Strategy Brings DSS to the Web; Company Aims to Dramatically Broaden Scope of Reporting, Online Analysis" PR Newswire Sep. 18, 1996.

"Andyne Introduces Greater Flexibility for Database Queries; New Query Management Option Provides Enhanced Management for Enterprise–Wide Queries" Business Wire Jan. 3, 1996.

Dana Marie Gardner, "Cashing in With Data Warehouses and the Web" Database Advisor, Feb. 1997.

Peter Brooks, "Targeting Customers", DBMS, Dec. 1996.

* cited by examiner

EX PARTE REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1–30 is confirmed.

\* \* \* \* \*